United States Patent [19]
Stein et al.

[11] Patent Number: 5,290,364
[45] Date of Patent: Mar. 1, 1994

[54] PROCESS FOR BLAST CLEANING FIXTURES HAVING INTERNAL PASSAGEWAYS

[75] Inventors: John Stein, Ada; Philip M. Whitney, Whitehall, both of Mich.

[73] Assignee: Grand Northern Products, Ltd., Grand Rapids, Mich.

[21] Appl. No.: 919,602

[22] Filed: Jul. 22, 1992

[51] Int. Cl.$^5$ .............................................. B08B 7/00
[52] U.S. Cl. ........................................ 134/7; 134/8; 134/22.12; 134/22.18; 134/26; 134/37; 134/22.1
[58] Field of Search .................. 134/7, 8, 22.1, 22.11, 134/22.12, 22.18, 22.16, 22.17, 26, 37; 15/345; 51/411

[56] References Cited
PUBLICATIONS

Brochure entitled "ARMEX Blast Media Maintenance Formula and the Accustrip System", 1990.
Brochure entitled "Please Your Toughest Customer", 1992.
Material Safety Data Sheet for ARMEX Blast Media, May 1, 1990.

*Primary Examiner*—R. Bruce Breneman
*Assistant Examiner*—Thomas G. Dunn, Jr.
*Attorney, Agent, or Firm*—Warner, Norcross & Judd

[57] ABSTRACT

A process for blast cleaning an article having internal passageways that produces a clean, weldable, and brazable article that is free of blast media residue. The process includes blasting the internal passageways of the article with a soluble blast media, rinsing the article with a solvent in which the blast media is soluble, and removing the solvent from the internal passageways of the article using a stream of air.

17 Claims, 2 Drawing Sheets

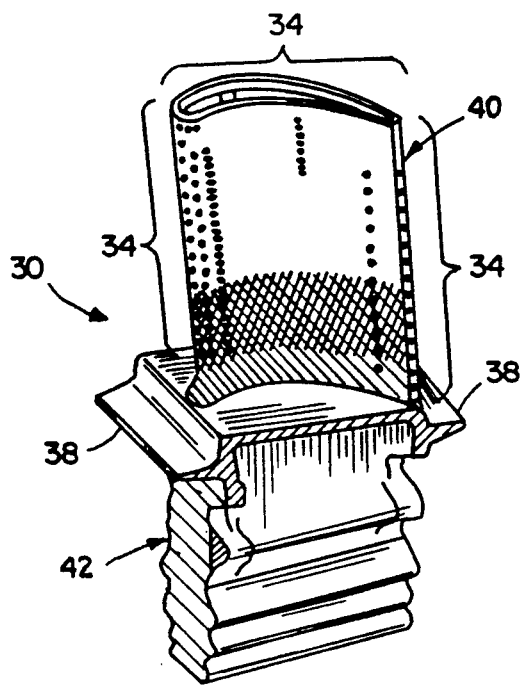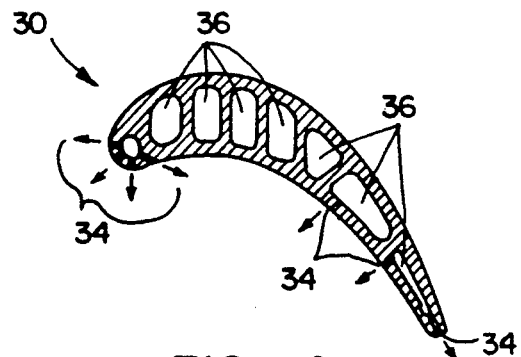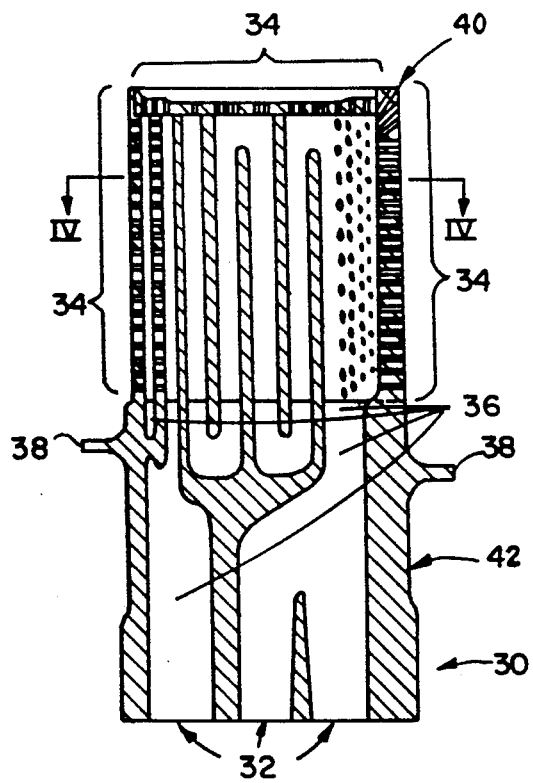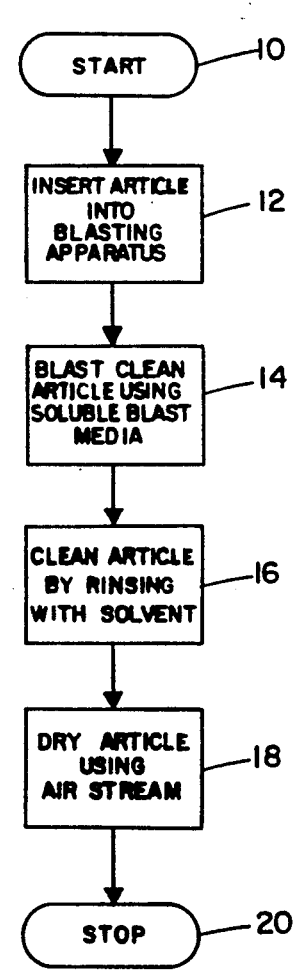

PROCESS FOR BLAST CLEANING FIXTURES HAVING INTERNAL PASSAGEWAYS

BACKGROUND OF THE INVENTION

The present invention relates to a process for blast cleaning articles—particularly those with internal passageways, which have a tendency to trap the blast media.

A variety of processes have been developed to blast clean articles with internal passageways and minute outlet holes. Such articles include, for example, jet turbine blades, where blast cleaning is periodically performed to remove oxides and other deposits. The blasting process includes directing a stream of air carrying a blast media through the article. The media is a particulate matter, so that the process is akin to "sand blasting."

Typically, the blast media is aluminum oxide or silicon carbide. Both aluminum oxide and silicon carbide have a tendency to embed in the surface of the article during blasting. The embedded aluminum oxide is relatively inert and hinders welding and brazing of the article. The embedded silicon carbide lowers the melting point of the article and may cause premature melting.

The blasting process further suffers in that the blast media tends to become lodged within the outlet holes and to accumulate inside the internal passageways of the article. The outlet holes must be manually cleared with a protrusion that is sufficiently narrow to fit within the outlet holes. This technique suffers in that it is tedious and requires excessive labor. Further, the blast media that has accumulated within the internal passageways cannot be properly removed in this manner.

Alternatively, the article can be cleaned in an autoclave, wherein the article is soaked in a hot caustic alkaline bath. This technique suffers in that additional equipment is necessary to autoclave the article and to handle the dangerous solutions. Further, the surface of the article or any article coatings are also leached in the autoclave.

SUMMARY OF THE INVENTION

The aforementioned problems are overcome by the present invention wherein a process for blast cleaning includes (1) blasting the article with a soluble blast media, (2) flushing the article with solvent to remove any residual blast media, and (3) blowing an air stream through the article to dispel the solvent.

Conventional blasting equipment can be easily adapted to perform the present process. A manifold is provided in which the article to be cleaned is seated. The manifold has an airtight and watertight seal that fits around the article. The article is seated within this seal so that the article inlet holes are located in a high-pressure chamber and the outlet holes of the article are located within a low-pressure chamber. A blasting stream carrying a soluble blast media is directed into the inlet holes, through the internal passageways of the article, and out the outlet holes. The blast media cleans the internal passageways of the article as it passes through. After blasting, a solvent is flushed through the article to remove an blast media that has accumulated within the internal passageways or has become lodged in the outlet holes. The blast media and solvent are selected so that they will not damage the surface of the article or any surface coatings. After flushing, an air stream is directed through the article to remove any solvent remaining within or upon the article. This final step reduces rusting, tarnishing or corrosion that may result if the solvent is left in contact with the article for extended periods of time.

The article cleaned by the present process is thoroughly blast cleaned and freed of residue from the blast media. Further, the article is brazable and weldable without any additional cleaning process.

These and other objects, advantages, and features of the present invention will be more fully understood and appreciated b reference to the detailed description of the preferred embodiment and the drawings.

BRIEF DESCRIPTION OF THE DRAWINGS

FIG. 2 is a perspective view of a article with internal passageways and minute outlet holes;

FIG. 3 is a vertical sectional view of the article shown in FIG. 2;

FIG. 4 is sectional view of the fixture taken along line IV—IV in FIG. 3; and

FIG. 5 is a flow chart of the steps involved in the present process.

DETAILED DESCRIPTION OF THE PREFERRED EMBODIMENT

Figure 1:
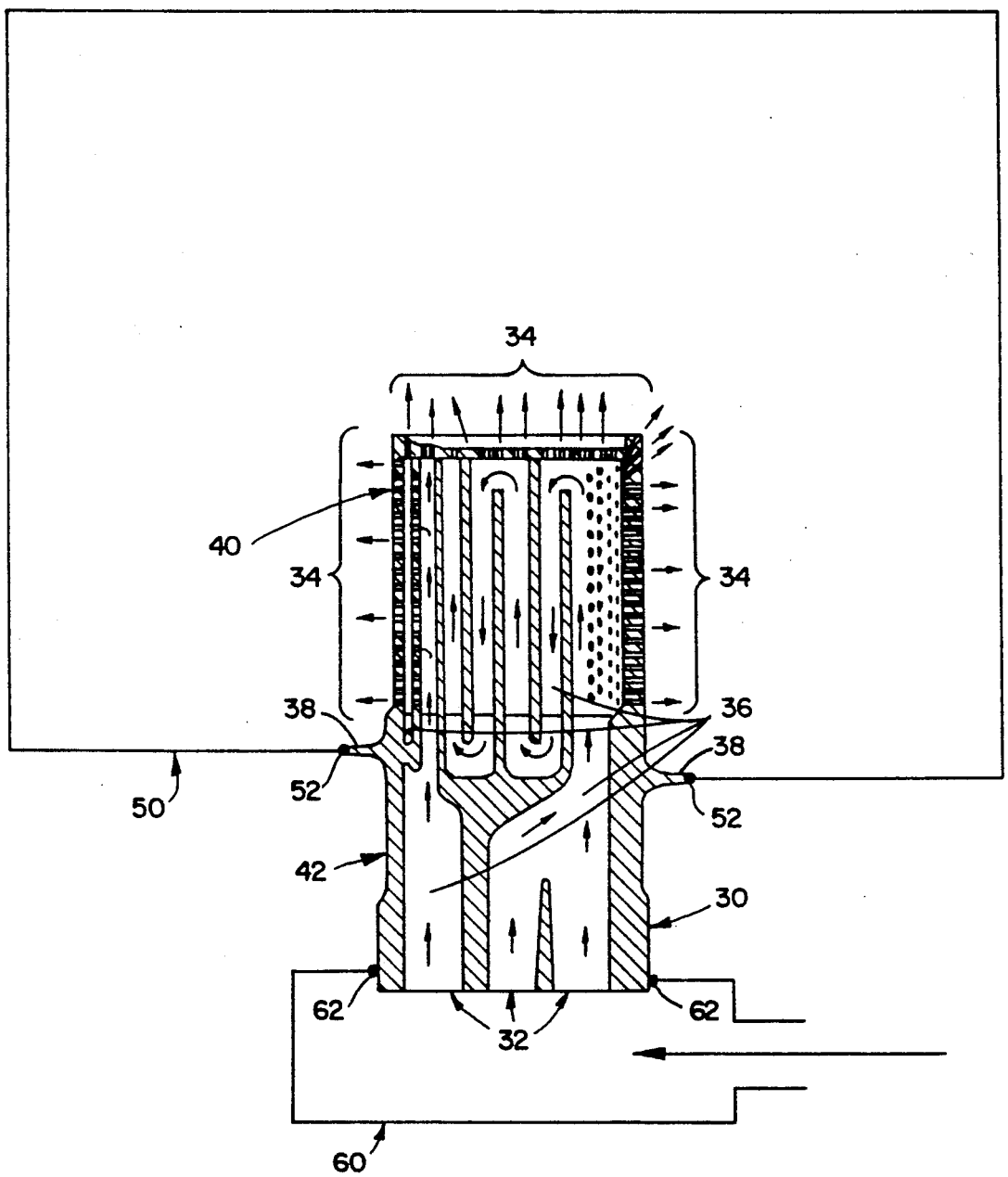
FIG. 1 is sectional view of the article seated within the blasting apparatus.

A preferred embodiment of the present invention is generally illustrated in FIG. 5, and includes the steps of blast cleaning an article with soluble blast media 14, cleaning the article by rinsing it with a solvent 16, and drying the article by applying a stream of air 18.

A representative article 30 with internal passageways 36 is generally depicted in FIG. 2. The article depicted is a jet turbine blade having internal passages for conveying cooling air. Other articles having internal passageways or otherwise restricted or inaccessible area can also be processed by the present invention. The article 30 includes a plurality of internal passageways 36, an outlet portion 40 that has a plurality of outlet holes 34, and an inlet portion 42 that has a plurality of inlet holes 32. The article 30 further includes a retention flange or collar 38. Sectional views that further clarify the internal structure of the article 30 are depicted in FIGS. 3 and 4. The flow of air through the article during normal operation is indicated by arrows in all views.

A blasting system suitable for use in the present process includes a manifold 60 that houses the inlet portion 42 of the article 30 (see FIG. 1). Such systems are generally well-known to those skilled in the particle blasting art and therefore will not be described in detail. The manifold 60 includes an airtight and watertight seal 62, that fits around the article 30 and seals the inlet holes 32 within the manifold 60. This creates a chamber around the inlet portion 42 of the article 30. The blasting system further includes a second chamber 50 that houses the outlet portion 40 of the article 30. The second chamber 50 includes an airtight and watertight seal 52, that fits against the seal tip 38 and seals the outlet holes 34 within the second chamber 50.

The pressure in the second chamber 50 is reduced to 0.001–10 PSI (pounds per square inch) below atmospheric pressure. The pressure in the manifold 60 is increased to 60–3000 PSI. The pressure differential between the manifold 60 and the second chamber 50 creates a gaseous flow that enters the inlet holes 32, passes through the internal passageways 36, and exits through the outlet holes 34. The preferred blasting gas is air, although other gases or combinations of gases may be used depending on the application.

The article 30 is blast cleaned 14 by introducing a soluble blast media into the air stream. The blast media in the preferred embodiment is sodium bicarbonate, which is preferred because it is water soluble. The blast media is introduced into the system at the manifold 60. The airflow through the article 30 carries the blast media into the article 30 through the inlet holes 32, through the internal passageways 36, and out the outlet holes 34. As a result, the blast media abrasively cleans the surfaces of the internal passageways 36 and the outlet holes 34.

Optionally, the pressure in the manifold 60 can be pulsated to provide a more turbulent stream of blast media, thereby creating increased abrasion between the blast media and the surfaces of the article 30. Pulsating the manifold pressure will drive blast media into otherwise passive areas. Although pulsating the blast pressure has been used in blasting external surfaces, it often results in uneven surface treatment. This phenomenon is called "striping".

The presently preferred blast media is the sodium bicarbonate sold by Church & Dwight Co., Inc. under the ARMEX trademark. Prior to the present invention, this media was used only in the external blasting of articles. Such blasting would include cleaning boat bottoms, buildings, and industrial machinery. This media has been accepted for these applications because of its nontoxicity.

After the article 30 is blast cleaned 14, it is removed from the blasting system and rinsed with a solvent 16 for the blast media. The solvent is used to remove any blast media that has accumulated within the article 30, or is lodged within the outlet holes 34. In the preferred embodiment, the solvent applied is water. Of course, the solvent will be selected depending on the media used. The solvent dissolves any remnants of sodium bicarbonate that remain within the article 30.

After the article 30 has been sufficiently rinsed 16, it is dried using an air stream 18. The stream of air is passed through the article 30 to force out and evaporate any remaining solvent. Drying 18 is necessary to reduce rust, tarnishing, or corrosion that may result from extended contact between the solvent and the article 30.

The present process results in a fully cleaned article with little or no blast media residue. The particulate sodium carbide is a fully effective blast media. The solvent rinse removes all or virtually all blasting media residue. Consequently, the cleaned part can be welded or brazed and retains all of its physical properties.

Another advantage of the present invention is its applicability to blast cleaning articles with restricted access areas. For example, the process can be used to clean and prepare a cracked article for welding or brazing. The surfaces of the crack can be thoroughly blast cleaned, rinsed and dried by a process similar to that described above. Again, the resulting article is free of any residue and is brazable and weldable without any additional cleaning process.

The above description is that of a preferred embodiment of the invention. Various changes and alterations can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A process for blast cleaning an article with internal passageways including the steps of:
    blasting an article by directing a gas stream containing a soluble blast media through the internal passageways of the article; and
    flushing the internal passageways after said blasting step with a solvent in which said soluble blast media is soluble to remove residual blast media left from said blasting step.

2. A process as defined in claim 1 further including drawing a sub-atmospheric vacuum at the outlets of the passageways to improve flow through said internal passageways of said article.

3. A process as defined in claim 1 wherein said soluble blast media is water soluble.

4. A process as defined in claim 3 wherein said water soluble blast media includes sodium bicarbonate.

5. A process as defined in claim 1 further including the step of directing a second gas stream through said internal passageways of said article after said flushing step, whereby said liquid solvent is removed from said internal passageways of said article.

6. A process as defined in claim 1 wherein the pressure of said gas stream containing said soluble blast media is pulsated.

7. A process for blast cleaning an article with restricted access areas including the steps of:
    directing a particle-blasting gaseous stream containing a soluble blast media into the restricted access areas of the article;
    flushing the article after the directing step with a solvent in which said soluble blast media is soluble, whereby residual blast media from said directing step is removed in said flushing step.

8. A process as defined in claim 7 further including the step of drawing a sub-atmospheric vacuum at a portion of the restricted areas generally opposite the directed particle blasting stream.

9. A process as defined in claim 7 wherein said soluble blast media is water soluble.

10. A process as defined in claim 9 wherein said water soluble blast media includes sodium bicarbonate.

11. A process as defined in claim 7 wherein the pressure of said particle-blasting gaseous stream is pulsated.

12. A process as defined in claim 7 further including the step of directing a second gas stream into the restricted access areas of the article, whereby said liquid solvent is removed from said restricted access areas.

13. A process for blast cleaning a article with internal passageways including the steps of:
    seating said article within a blasting apparatus, said blasting apparatus including a manifold and a vacuum chamber, said manifold forming a housing that encloses the inlet holes of said internal passageways, said vacuum chamber forming a second housing that encloses the outlet holes of said internal passageways;
    reducing the pressure within said vacuum chamber and increasing the pressure within said manifold, whereby a gas stream is caused to flow through said internal passageways of said article;
    introducing a soluble blast media within said manifold, whereby said soluble blast media is driven through said internal passageways of said article by said gas stream;

subsequently flushing said internal passageways of said article with a solvent in which the blast media is soluble; and subsequently directing a second gas stream through said internal passageways of said article, whereby said liquid solvent is removed from said internal passageways of said article.

14. A process as defined in claim 13 wherein said blast media is water soluble.

15. A process is defined in claim 14 wherein said water soluble blast media includes sodium bicarbonate.

16. A process as defined in claim 13 wherein the pressure in said manifold is pulsated.

17. A process as defined in claim 13 wherein the pressure in said vacuum chamber is pulsated.

* * * * *